United States Patent
Sanders et al.

(10) Patent No.: US 6,834,413 B2
(45) Date of Patent: Dec. 28, 2004

(54) VARIABLE SPEED LEAF BLOWER

(75) Inventors: Daniel L. Sanders, Horatio, AR (US);
Tomas A. Pribanic, Miami, FL (US);
Terry D. Jewell, Macon, GA (US);
Sieglinde J. Verges, Texarkana, TX (US); Don M. Woods, Ingram, TX (US)

(73) Assignee: Electrolux Home Products, Inc., Cleveland, OH (US)

( * ) Notice: Subject to any disclaimer, the term of this patent is extended or adjusted under 35 U.S.C. 154(b) by 0 days.

(21) Appl. No.: 10/178,946

(22) Filed: Jun. 24, 2002

(65) Prior Publication Data

US 2003/0233730 A1 Dec. 25, 2003

(51) Int. Cl.[7] .................................................. A47L 5/00
(52) U.S. Cl. ........................................ 15/405; 15/339
(58) Field of Search ........................... 15/330, 339, 405

(56) References Cited

U.S. PATENT DOCUMENTS

| | | | |
|---|---|---|---|
| 4,237,576 A | * 12/1980 | Stakes | 15/344 |
| 4,325,163 A | * 4/1982 | Mattson et al. | 15/330 |
| 4,370,777 A | * 2/1983 | Woerwag | 15/339 |
| 4,419,783 A | * 12/1983 | Steffen | 15/339 |
| 4,694,528 A | 9/1987 | Comer et al. | |
| 4,945,604 A | * 8/1990 | Miner et al. | 15/344 |
| D310,437 S | 9/1990 | Gierke et al. | |
| 5,251,281 A | 10/1993 | Fravel, Jr. | |
| D368,341 S | 3/1996 | Pink | |
| 5,701,631 A | * 12/1997 | Lindquist | 15/327.1 |
| 5,737,798 A | * 4/1998 | Moren et al. | 15/413 |
| 5,810,109 A | 9/1998 | Chu | |
| 5,815,363 A | 9/1998 | Chu | |
| D426,354 S | 6/2000 | Ohi et al. | |
| 6,105,206 A | 8/2000 | Tokumaru et al. | |
| 6,118,085 A | 9/2000 | Chu | |
| 6,118,239 A | * 9/2000 | Kadah | 318/268 |
| 6,130,393 A | 10/2000 | Chu | |
| 6,226,833 B1 | * 5/2001 | Kawaguchi et al. | 15/405 |
| 6,274,828 B1 | 8/2001 | Chu | |
| 6,281,482 B1 | 8/2001 | Chu | |
| 6,388,408 B1 | 5/2002 | Chu | |
| D461,604 S | 8/2002 | Martin et al. | |
| 6,483,063 B2 | 11/2002 | Chu | |

* cited by examiner

*Primary Examiner*—Terrence R. Till
(74) *Attorney, Agent, or Firm*—Marc A. Hubbard; Munsch Hardt Kopf & Harr PC

(57) ABSTRACT

A portable leaf blower that includes a housing having an inlet and an outlet and an impeller adapted to generate an airflow from the inlet to the outlet. An electric motor rotatably drives the impeller. The leaf blower includes a power control circuit for substantially continuously varying the speed of the electric motor. A thumb wheel mounted in the handle of the leaf blower is used to control the amount of power delivered to the electric motor.

12 Claims, 4 Drawing Sheets

VARIABLE SPEED LEAF BLOWER

TECHNICAL FIELD OF THE INVENTION

The present invention relates generally to a portable apparatus for blowing and vacuuming outdoor areas.

BACKGROUND OF THE INVENTION

Portable leaf blowers are used to sweep outdoor areas of leaves, grass clippings, and other debris using high velocity air. They include a motor, such as an electric motor or an internal combustion engine, and a fan driven by the motor that generates airflow from an inlet of the housing to an outlet of a housing. The fan is typically a centrifugal impeller in a housing in the shape of a volute. Air flows into an opening formed in a side wall of the housing, generally in the direction of the axis of the impeller, and then outwardly into the housing in directions that are generally perpendicular to the axis of the impeller. The air is then collected and directed toward an exit opening by an outside wall of the housing.

Some portable leaf blowers are designed to operate in either of two modes, blower or vacuum. These devices are sometimes referred to as "convertible blower/vacuums" or "blower/vacs." In a blower mode of operation, an elongated tube is attached to the housing outlet. The tube has an exit opening near the ground in order to deliver a concentrated column of high velocity air near the ground. In a vacuum mode of operation, an elongated tube is secured to the housing inlet and a debris collection bag is attached to the housing outlet. The term "leaf blower" will be used to refer to both single mode blowers and dual mode convertible blower/vacuum units.

When sweeping leaves, it is desirable to be able to change the velocity of the air coming out of a leaf blower. Internal combustion engines inherently permit control over the air velocity by means of their throttles. Leaf blowers powered by electric motors, however, typically have a two position "on/off" switch or a switch that also provides two, discrete speed settings, "high" and "low." Some electrically powered leaf blowers mechanically restrict the size or area of an inlet or an outlet opening to reduce air flow rates.

SUMMARY OF THE INVENTION

Mechanical air flow rate control devices on electric leaf blowers that restrict air flow have several shortcomings. They are, for example, relatively cumbersome to operate and typically require one hand to hold the device and a second hand to manipulate the mechanical air restrictor. Some devices only have two positions, open and closed, which do not provide sufficient control for some users.

The present invention is directed generally to an electric leaf blower having an improved air speed control overcoming one or more of these and/or other shortcomings. According to the invention, an electric leaf blower includes an operator-controllable circuit for continuously varying the speed of an electric motor rotating a fan of over at least a range of speeds, thereby allowing the user to control the speed of the air flow at the outlet of the leaf blower.

In a representative example of a leaf blower employing a preferred embodiment of the invention, a thumb wheel or other element suitable for generating a signal to a power control circuit for an electric motor is mounted for access by a user while the blower is being operated. Preferably, it is mounted in a handle of the leaf blower in order to allow a user to continuously vary the speed of the electric motor without requiring the user to stop blowing leaves or to use the other hand to make the adjustment. A power control circuit regulates the power supplied to, and thus also the speed of, an electric motor connected to a fan of a leaf blower. To dissipate heat generated by one or more components of the control circuit, the one or more heat generating components are preferably mounted on a heat sink that is mounted to an inside wall of a housing of the blower's fan, to be cooled by air currents generated by the fan.

These and other aspects of a preferred embodiment of the invention and their respective advantages are described below in reference to a representative leaf blower.

DETAILED DESCRIPTION OF THE DRAWINGS

Figure 1:
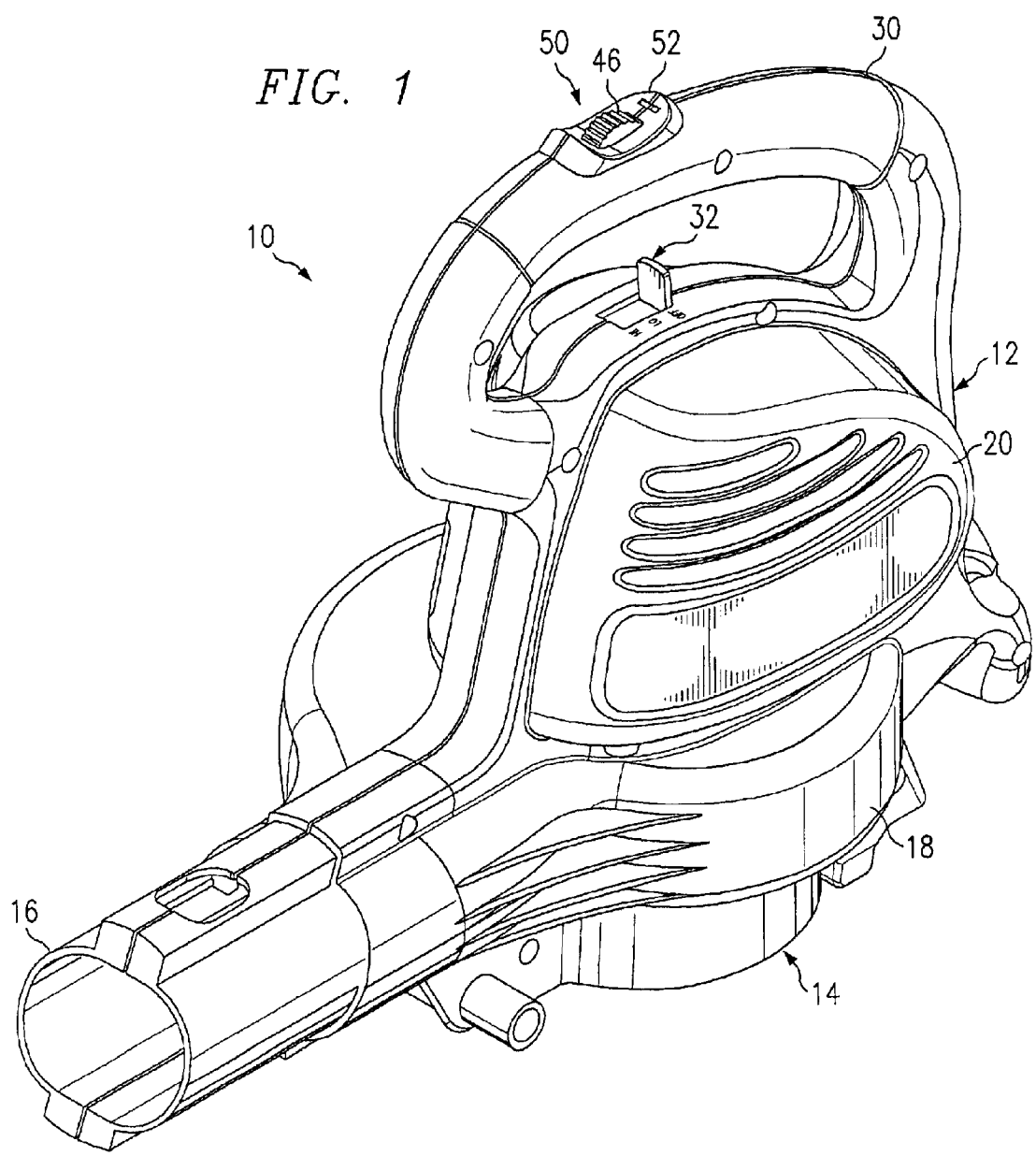
FIG. 1 is isometric view of a representative leaf blower.

Referring to FIGS. 1–4, portable leaf blower-vacuum 10 is a representative example of leaf blowers. The teachings of the invention are also applicable to leaf blowers that are not convertible into vacuums. Blower-vacuum 10 includes housing 12, that is generally comprised of a fan volute 18 and cowling or cover 20 for electric motor 22. The fan volute defines an air inlet 14 and an air outlet 16. Housing 12 is preferably fabricated as a two-piece shell, formed by shell halves 24 and 26, such as by plastic injection molding each piece. These pieces are joined together by screws, rivets or other types of fasteners, which are not shown. The invention is not limited, however, to any particular shape or method of fabrication and assembly of the housing.

Figure 2:
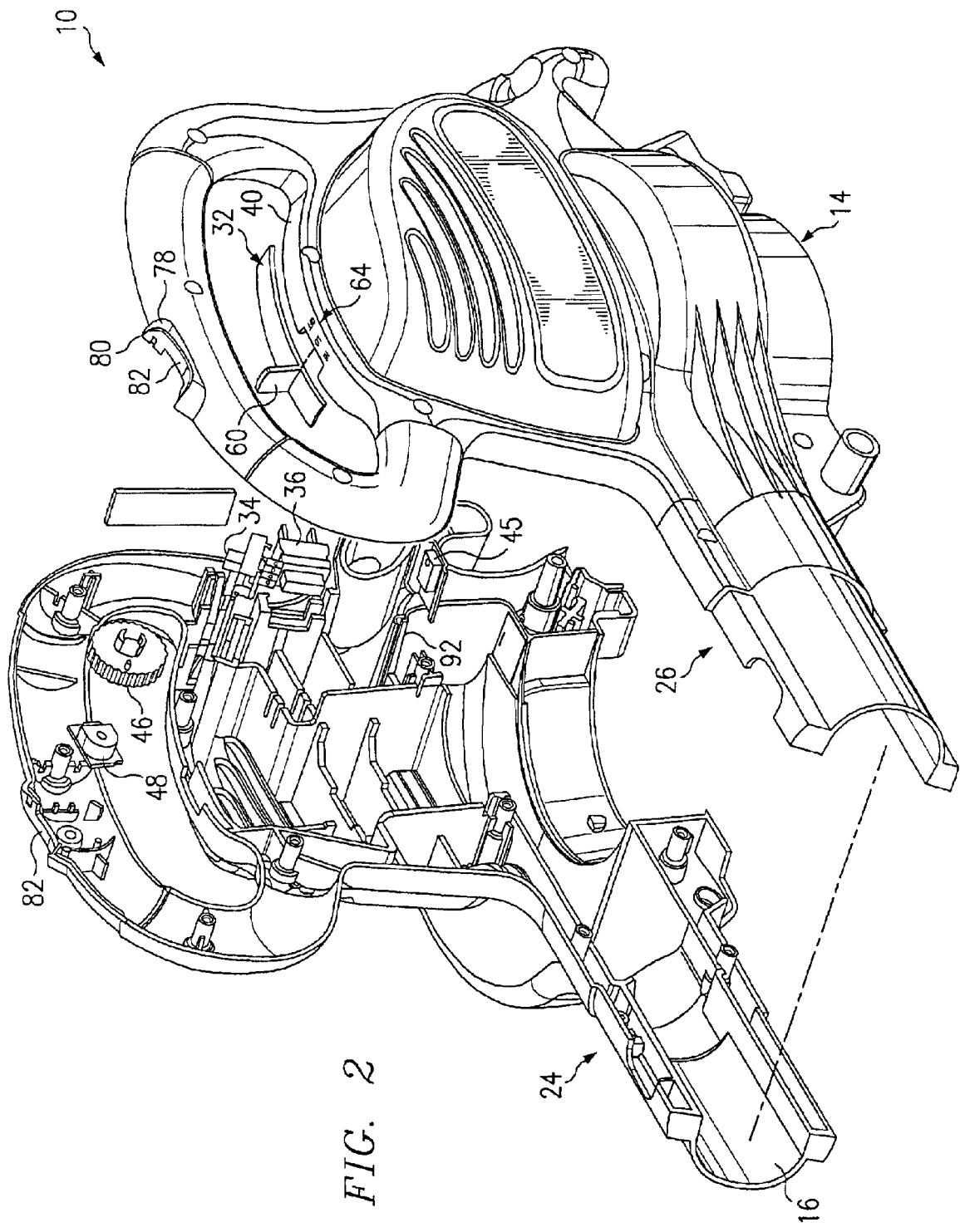
FIG. 2 is an exploded assembly view of the leaf blower of FIG. 1.
Figure 3:
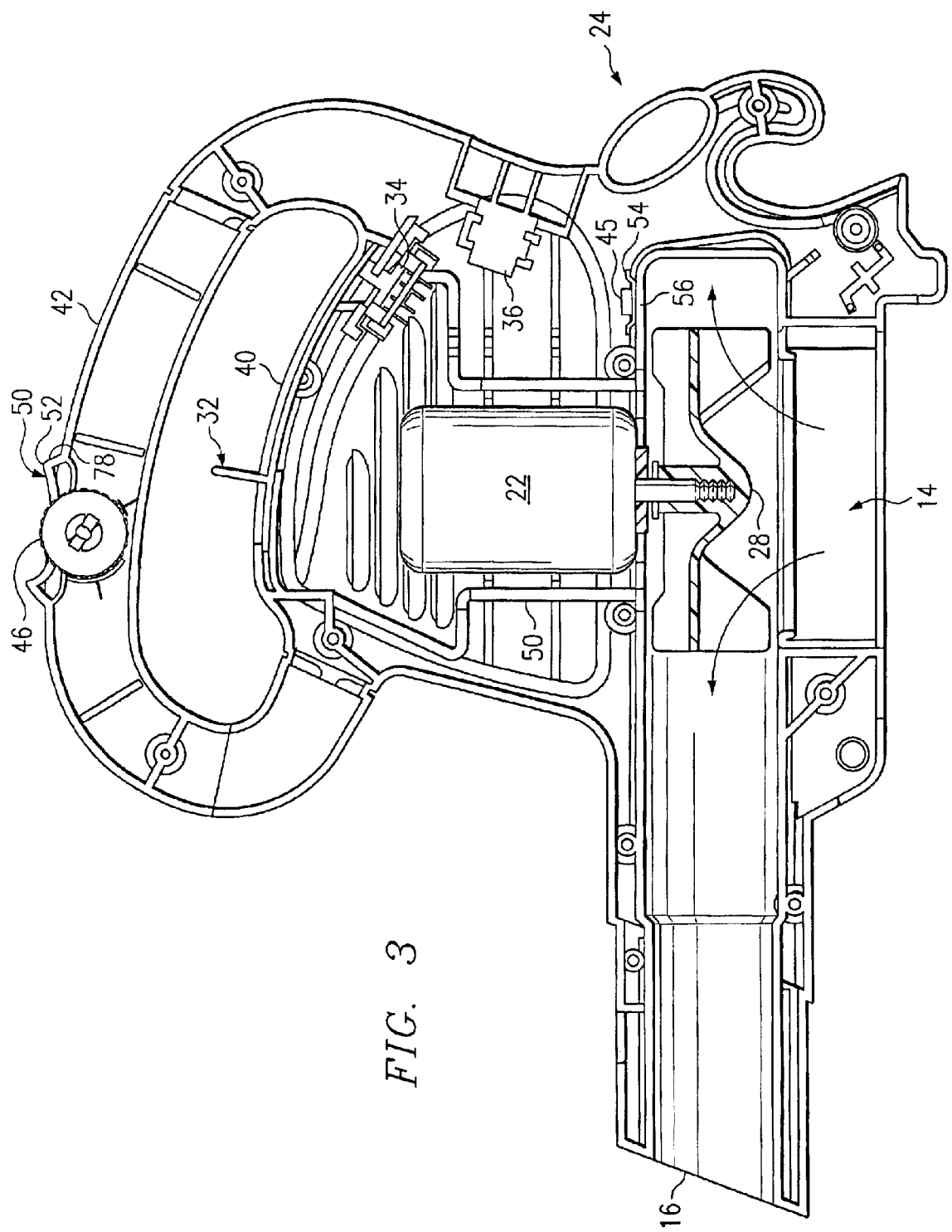
FIG. 3 is a sectional view of the leaf blower of FIG. 1.

In operation, air is drawn into the inlet 14 by impeller 28 and expelled at a relatively higher velocity through outlet 16. To simplify the drawing, neither motor 22 nor impeller 26 are shown in FIG. 2. Various tube attachments, collection bags, or other components (not shown) may be respectively coupled to inlet 14 and outlet 16 to accommodate use of the blower-vacuum 10 in either a blowing or vacuuming application.

The blower-vacuum 10 also includes a handle 30 for carrying and pointing blower-vacuum 10. Handle 30 is intended to be a representative example. It may be formed as an integral component of housing 12, as illustrated, or may be formed separately and attached to housing 12 or other component of the blower-vacuum. It may also possess a different shape or configuration.

The blower-vacuum includes a switch that turns off and on the electric motor by connecting and disconnecting AC power to the motor. The same switch also preferably includes, in addition to an "off" position, multiple discrete "on" positions for connecting in series with the motor in at least one of the positions a power controlling circuit. More than one power controlling circuit may be included. The power controlling circuit provides continuously variable control over the amount of power supplied to the electric motor of the leaf blower. Alternately, if the switch has a single "on" position, the power controlling circuit is placed in series with the motor in the "on" position. In the illustrated example, a user manipulates lever 32 to move the contacts of switch 34. Lever 32 slides within the housing and is mechanically coupled with the switch. AC power, which is supplied through plug 36, is connected and disconnected to electric motor 22 through switch 34. Wiring has been admitted for clarity in FIGS. 1–3. A user of the blower/vacuum manipulates wheel 46 to signal the power control circuit of how much power to provide to the motor, or how much to impede or reduce the AC power being delivered to the motor. Wheel 46 is preferably mounted in handle 30 in a position that allows a user to turn the wheel using the thumb or another digit of the hand holding the handle. A user's thumb may easily manipulate the wheel in this position. However, the wheel could be mounted elsewhere, for example under the handle, for manipulation by other digits of a user. It is also preferable to mount wheel 46 within a saddle 50 or configuration. The saddle has forward and aft lips or sides 52 that define a concave recess. The saddle provides tactile feedback to a user of the position of the wheel on the housing, and provides a place for a user to rest his or her thumb during operation while maintaining contact with the wheel. The saddle thus protects against accidental manipulation of the wheel and provides greater comfort and control for the user.

In a preferred embodiment, the power controlling circuit includes an alternating current triode or triac 45, the impedance of which varies based on a voltage applied to its gate. The user varies the voltage by rotating wheel 46, which is mechanically coupled to a variable resistor. The triac is an analog device and thus its impedance can vary continuously over at least a predetermined operating range. However, a power control circuit with discrete power control levels could approximate the analog nature of a triac, and thereby provide substantially continuously variable control. For example, an electronic circuit could be used instead of a variable resistor to generate control signals at discrete voltage levels. The electronic circuit would approximate the continuously variable nature of the variable resistor with discrete control signal levels, thereby providing substantially continuously variable control. Furthermore, digital power control devices could be used in place of the triac. A triac, however, is advantageous for this application due to its simple design and effectiveness. Thus, it is preferred.

Current flowing through the power controlling circuit can generate substantial amounts of thermal energy. Thus, it is preferable to mount, the circuit's power dissipating component(s), such as triac 45, in a location where it may take advantage of the airflow generated by the blower/vacuum to facilitate the dissipation of the thermal energy it generates. A heat sink is disposed in a wall of the fan volute 18, one side of the heat sink is exposed to the airflow, and the triac is mounted to the opposite side of the heat sink. In the preferred embodiment, metal plate 54, which forms a heat sink, slides into a slot 56 defined in a wall of the fan volute 18. The wall is preferably an upper wall of the fan volute, as shown, as opposed to a side or a bottom wall. This allows the triac to be more easily installed inside housing 12. Mounting the heat sink in a wall of the fan volute other than a sidewall also reduces the force of impact of any debris entrained in the air.

Figure 4:
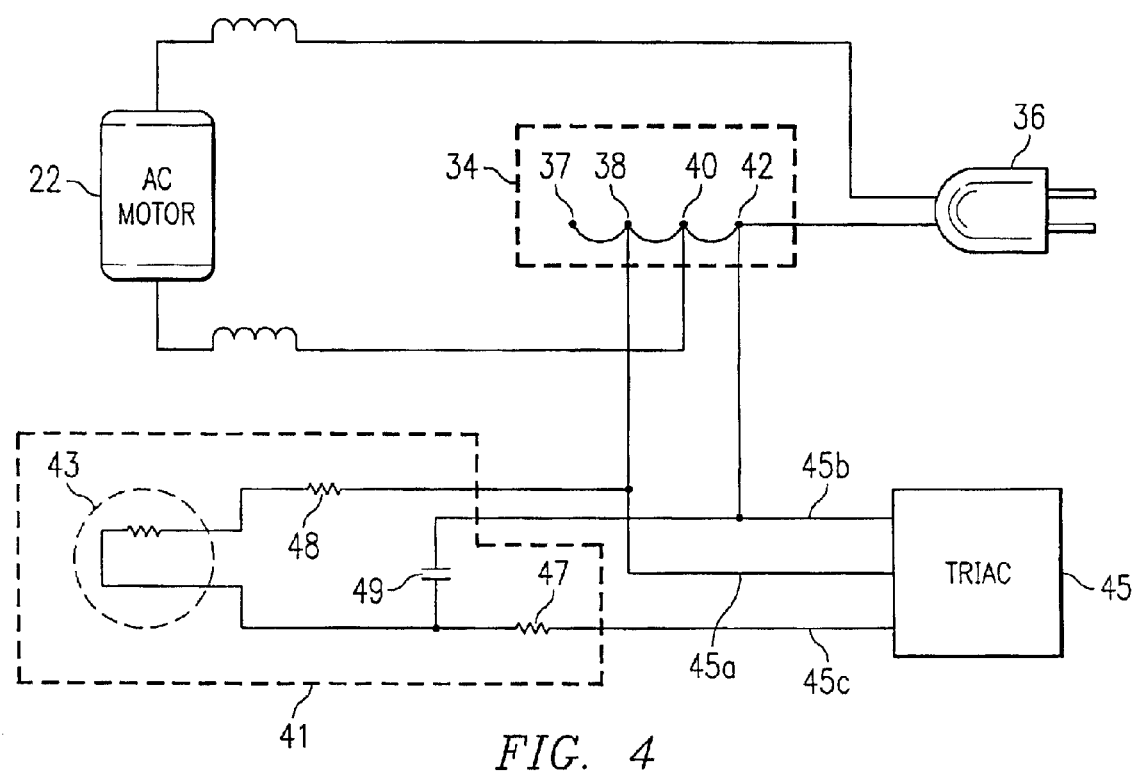
FIG. 4 is a schematic drawing of a power circuit for the leaf blower of FIG. 1.

Referring now to the schematic wiring diagram of FIG. 4, switch 34 has, in the illustrated example, three positions and four terminals in 37, 38, 40 and 42. Terminal 37 is disconnected. Terminal 38 is connected to first lead 45a of triac 45. Terminal 40 is connected to one side of motor 22. Terminal 42 is connected to one contact of AC power plug 36 and second lead 45b of triac 45. Terminals 38 and 40 are also connected to a gate voltage control circuit, which in the illustrated embodiment is designated by reference number 41. The gate voltage control circuit generates a voltage signal that is applied to gate lead 45c of triac 45. When the contact of switch 34 contacts terminals 37 and 38. As no circuit is completed, this is the "off" position. When the switch's contact is in a second position, corresponding to a "low speed" position, terminals 38 and 40 are connected. This position results in placing triac 45 in series between motor 22 and plug 36. It also completes the gate voltage control circuit 41 and supplies power to it. The gate voltage control circuit is comprised of variable resistor 46, resistors 47 and 48, and capacitor 49 varying variable resistor 46 varies the voltage on gate lead 45c of triac 45. In a third position, corresponding to a "high speed" position, plug 36 and motor 22 are directly coupled; the triac and gate voltage control circuit are not connected in the circuit.

While the invention has been particularly shown and described by the foregoing detailed description, it will be understood by those skilled in the art that various other changes in form and detail may be made without departing from the spirit and scope of the invention.

What is claimed is:

1. A portable leaf blower, comprising:
   an electric motor rotating an impeller to generate a flow of air through a fan housing having an inlet and an outlet;
   a handle for manually carrying the motor and fan housing;
   a power control circuit coupled with the motor for substantially continuously controlling an amount of power delivered to the motor over at least a predetermined power range, whereby the speed of the motor is substantially continuously variable over at least a predetermined range in speeds; and
   a device mounted in the handle for manipulation by a digit of a user holding the handle, the device being coupled to the power control circuit for causing the power control circuit to change the amount of power being delivered to the motor in response to movement of the user's digit, wherein the device is comprising of a rotatable wheel mounted in the handle.

2. The portable leaf blower of claim 1, wherein the power control circuit includes a variable AC impedance device.

3. A portable leaf blower, comprising:
   an electric motor rotating driving an impeller to generate a flow of air through a fan housing having an inlet and an outlet;
   a handle for manually carrying the motor and fan housing;
   a power control circuit in series with the motor for substantially continuously controlling an amount of power delivered to the motor over at least a predetermined range of power, whereby the speed of the motor is substantially continuously variable over at least a predefined range of speeds, the power control circuit including a variable AC impedance device; and
   a wheel mounted in the handle for manipulation by a digit of a user holding the handle, the wheel being coupled to the power control circuit for causing the power control circuit to change the amount of power being delivered to the motor.

4. A portable leaf blower, comprising:
   an electric motor rotating driving an impeller to generate a flow of air through a fan housing having an inlet and an outlet;
   a handle for manually carrying the motor and fan housing; and
   a power control circuit in series with the motor for substantially continuously controlling an amount of power delivered to the motor over at least a predetermine range of power, whereby the speed of the motor is substantially continuously variable over least a predefined range of speeds; the power control circuit including a variable AC impedance device mounted on a heat sink disposed within a wall of the fan housing so that the flow of air passes the heat sink.

5. The portable leaf blower of claim 4, wherein, the variable AC impedance device includes a triac, and the control signal includes a voltage control signal applied to the triac.

6. The portable leaf blower of claim 4, further comprising a user input device mounted in the handle adapted for manipulation by a digit of a user holding the handle, the device being coupled to the AC impedance device for causing the AC impedance device to change the amount of power being delivered to the motor in response to movement of the user's digit.

7. The portable leaf blower of claim 6, wherein the user input device is comprised of a rotatable wheel mounted in the handle.

8. A portable leaf blower, comprising:

an electric motor rotating driving an impeller to generate a flow of air through a fan housing having an inlet and an outlet;

a handle for manually carrying the motor and fan housing;

a switch having a plurality of positions, a first one of the plurality of positions turning the motor off, a second one of the plurality of positions connecting the electric motor to a power source, and a third one of the plurality of positions connecting the electric motor to a power control circuit for substantially continuously controlling an amount of power delivered to the motor over at least a predetermined range of power, whereby the speed of the motor is substantially continuously controllable over at least a predefined range of speeds.

9. The portable leaf blower of claim 8, wherein the power control circuit includes a variable AC impedance device.

10. The portable leaf blower of claim 9, wherein the variable AC impedance device includes a triac controlled by a voltage signal.

11. The portable leaf blower of claim 8, further including a wheel mounted in the handle for manipulation by a digit of a user holding the handle, the wheel being coupled to the power control circuit for causing the power control circuit to change the amount of power being delivered to the motor.

12. A portable leaf blower, comprising:

an electric motor rotating driving an impeller to generate a flow of air through a fan housing having an inlet and an outlet;

a handle for manually carrying the motor and fan housing;

a switch having a plurality of positions, a first one of the plurality of positions turning the motor off, a second one of the plurality of positions connecting the electric motor to a power source, and a third one of the plurality of positions connecting the electric motor to the power source through a power control circuit capable of substantially continuously varying its impedance over at least a predetermined range of power, whereby the speed of the motor is substantially continuously controllable over at least a predefined range of speeds, the power control circuit including a triac controlled by a voltage signal; and a wheel mounted in the handle for manipulation by a digit of a user holding the handle, the wheel's rotation varying the voltage signal applied to the triac.

* * * * *

UNITED STATES PATENT AND TRADEMARK OFFICE
CERTIFICATE OF CORRECTION

PATENT NO. : 6,834,413 B2
DATED : December 28, 2004
INVENTOR(S) : Sanders et al.

It is certified that error appears in the above-identified patent and that said Letters Patent is hereby corrected as shown below:

<u>Column 4,</u>
Line 38, please change "comprising" to -- comprised --.

Signed and Sealed this

Ninth Day of August, 2005

JON W. DUDAS
*Director of the United States Patent and Trademark Office*